United States Patent
Nair et al.

(10) Patent No.: US 11,051,150 B2
(45) Date of Patent: Jun. 29, 2021

(54) MACHINE-TO-MACHINE NETWORK OPTIMIZATION AND ONLINE CHARGING

(71) Applicant: MICROSOFT TECHNOLOGY LICENSING, LLC, Redmond, WA (US)

(72) Inventors: Girish Nair, Nashua, NH (US); Srinivas Kappla, Nashua, NH (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

(21) Appl. No.: 15/840,269

(22) Filed: Dec. 13, 2017

(65) Prior Publication Data
US 2018/0167763 A1 Jun. 14, 2018

Related U.S. Application Data

(60) Provisional application No. 62/433,412, filed on Dec. 13, 2016.

(51) Int. Cl.
*H04W 4/70* (2018.01)
*H04L 12/14* (2006.01)
(Continued)

(52) U.S. Cl.
CPC .......... *H04W 4/70* (2018.02); *H04L 12/1407* (2013.01); *H04L 12/1467* (2013.01);
(Continued)

(58) Field of Classification Search
None
See application file for complete search history.

(56) References Cited

U.S. PATENT DOCUMENTS

| 5,027,388 A | 6/1991 | Bradshaw et al. |
| 8,522,241 B1 | 8/2013 | Vohra et al. |

(Continued)

FOREIGN PATENT DOCUMENTS

| JP | 2002-319963 A | 10/2002 |
| JP | 2010088013 A | 4/2010 |

(Continued)

OTHER PUBLICATIONS

Extended European Search Report issued by the European Patent Office for European Patent Application No. 12868870.2, dated Sep. 4, 2015 (10 pgs.).

(Continued)

*Primary Examiner* — Adnan Baig
(74) *Attorney, Agent, or Firm* — Ray Quinney & Nebeker; Thomas M. Hardman; Sunah K. Lee

(57) ABSTRACT

Systems and methods for improving efficiency in a mobile communications network are described. In one embodiment, a method for conserving network resources comprises releasing network resources related to a User Equipment ("UE") session at one or more network nodes without notifying the UE. A subset of the session information that can be used to connect with the UE is stored at a network node. If data is received for the UE, the stored subset of information can be used to 1) establish network resources related to the UE that were previously released and 2) deliver the data to the UE. In another embodiment, shared data resources are granted to one or more subscribers associated with a Designated User Group ("DUG"). An online charging session is assigned to the DUG that identifies policy data for granting shared data resources to the Designated User Group.

12 Claims, 9 Drawing Sheets

(51) Int. Cl.

| | |
|---|---|
| *H04W 72/04* | (2009.01) |
| *H04W 76/19* | (2018.01) |
| *H04M 15/00* | (2006.01) |
| *H04L 29/08* | (2006.01) |
| *H04W 4/24* | (2018.01) |
| *H04W 76/38* | (2018.01) |
| *H04W 76/36* | (2018.01) |

(52) U.S. Cl.
CPC .......... *H04L 67/141* (2013.01); *H04M 15/00* (2013.01); *H04M 15/59* (2013.01); *H04M 15/64* (2013.01); *H04M 15/66* (2013.01); *H04M 15/8228* (2013.01); *H04W 4/24* (2013.01); *H04W 72/048* (2013.01); *H04W 76/19* (2018.02); *H04W 76/38* (2018.02); *H04L 67/143* (2013.01); *H04W 76/36* (2018.02)

(56) References Cited

U.S. PATENT DOCUMENTS

| | | |
|---|---|---|
| 8,620,263 B2 | 12/2013 | Ravishankar et al. |
| 9,013,993 B2 | 4/2015 | Logan et al. |
| 9,094,538 B2 | 7/2015 | Mohammed et al. |
| 9,544,751 B2 | 1/2017 | McNamee et al. |
| 2003/0171114 A1 | 9/2003 | Hastings |
| 2009/0124284 A1 | 5/2009 | Scherzer et al. |
| 2009/0300173 A1 | 12/2009 | Bakman et al. |
| 2010/0035576 A1 | 2/2010 | Jones et al. |
| 2010/0050172 A1 | 2/2010 | Ferris |
| 2010/0317331 A1 | 12/2010 | Miller |
| 2011/0125905 A1 | 5/2011 | Baucke et al. |
| 2011/0211583 A1 | 9/2011 | Seetharaman et al. |
| 2012/0030349 A1 | 2/2012 | Sugai |
| 2012/0257499 A1 | 10/2012 | Chatterjee et al. |
| 2013/0044646 A1 | 2/2013 | Qu et al. |
| 2013/0095815 A1 | 4/2013 | Venkatraman et al. |
| 2013/0132854 A1 | 5/2013 | Raleigh et al. |
| 2013/0173804 A1 | 7/2013 | Murthy et al. |
| 2013/0183971 A1* | 7/2013 | Tamaki ............ H04W 36/0061 455/436 |
| 2013/0231080 A1 | 9/2013 | Cheuk et al. |
| 2013/0267196 A1 | 10/2013 | Leemet et al. |
| 2014/0098671 A1 | 4/2014 | Raleigh et al. |
| 2014/0187199 A1 | 7/2014 | Yan et al. |
| 2014/0321310 A1 | 10/2014 | Wang |
| 2014/0348069 A1* | 11/2014 | Wang .................... H04W 76/32 370/328 |
| 2015/0215796 A1* | 7/2015 | Gustafsson ........... H04W 24/08 455/405 |
| 2015/0222546 A1 | 8/2015 | Van Phan et al. |
| 2016/0072963 A1 | 3/2016 | Cai et al. |
| 2016/0269566 A1 | 9/2016 | Gundamaraju et al. |
| 2018/0041892 A1 | 2/2018 | Hurtta |

FOREIGN PATENT DOCUMENTS

| | | | |
|---|---|---|---|
| JP | 2011-259440 A | 12/2011 | |
| WO | WO-2009071431 | 6/2009 | |
| WO | WO-2009071431 A1 | 6/2009 | |
| WO | WO-2010066430 A1 | 6/2010 | |
| WO | WO-2012084019 A1 * | 6/2012 | ............ H04W 24/02 |
| WO | WO-2014005729 A1 * | 1/2014 | ......... H04L 61/2007 |
| WO | WO-2014026800 A1 * | 2/2014 | |

OTHER PUBLICATIONS

Rodriguez, M. G., et al., "A 3GPP System Architecture Evolution Virtualized Experimentation Infrastructure for Mobility Prototyping (Invited Paper)", Proc. of the 4th International Conference on Testbeds and Research Infrastructures for the Development of Networks & Communities, 10 pgs. (Mar. 18, 2008).

International Search Report and Written Opinion as issued by the U.S. Patent and Trademark Office as international searching authority, issued in PCT/US16/31194, dated Aug. 16, 2016 (7 pages).

International Search Report and Written Opinion issued by the U.S. Patent and Trademark Office as International Searching Authority for International Patent Application No. PCT/US16/21744 dated Jun. 9, 2016 (8 pages).

Taniguchi, Y., et al., "Implementation and Evaluation of Cooperative Proxy Caching System for Video Streaming Services", Technical Report for the Institute of Electronics Information and Communication Engineers, IEICE, Japan, vol. 103, No. 650, pp. 13-18 (Feb. 5, 2014)—English Abstract.

International Search Report and Written Opinion issued by the European Patent Office as International Searching Authority, in International Application No. PCT/US2017/066023, dated Apr. 26, 2018 (19 pages).

"Office Action Issued in European Patent Application No. 17822970.4", dated Jun. 29, 2020, 5 Pages.

"Office Action Issued in European Patent Application No. 17822970.4", dated Jan. 19, 2021, 5 Pages.

"Pre-Interview First Office Action Issued in U.S. Appl. No. 16/567,378", dated Feb. 16, 2021, 12 Pages.

* cited by examiner

MACHINE-TO-MACHINE NETWORK OPTIMIZATION AND ONLINE CHARGING

CROSS-REFERENCE TO RELATED APPLICATIONS

This application claims the benefit under 35 U.S.C. § 119(e) to U.S. Provisional Application No. 62/433,412, entitled "MACHINE-TO-MACHINE NETWORK OPTIMIZATION AND ONLINE CHARGING," filed on Dec. 13, 2016, the contents of which are incorporated by reference herein in its entirety.

FIELD OF INVENTION

The invention generally relates to telecommunications systems and, in particular, to "machine to machine" (M2M) and radio access network (RAN) communication systems.

BACKGROUND

Machine to machine (M2M) communication is a rapidly expanding area in wireless network technology. M2M devices can be: real time or non-real time, low throughput or high throughput, and mobility or no mobility type. The number of M2M devices is expected to reach 1 billion devices by around 2020. With such a dramatic increase in scale, traditional subscriber traffic models and billing/charging plans are not likely to be feasible. In addition, although the number of M2M devices that are connected to long-term evolution (LTE) networks is very high, operators do not receive revenue for each M2M device. Although some M2M devices may fit into existing $3^{rd}$ Generation Partnership Project (3GPP) defined charging, not all types of M2M devices will be accommodated.

Operators often need to invest in LTE equipment in proportion to their subscriber counts, however the associated revenue generation is not proportional to the investment. With the advent of M2M, operators may also need to support an increased number of mobility management entities (MMEs), serving gateways (SGWs), packet gateways (PGWs), policy and charging rules functions (PCRFs), home location registers (HLRs), online charging systems (OCSs), and offline charging systems (OFCSs). Moreover, M2M functions, such as energy/power meter reporting and vending machine charging can have different charging parameters. In such arrangements, users of the associated M2M devices do not pay money directly to operators, but rather the energy companies or vending companies that provide the M2M devices to users pay, for example based on overall usage, and/or for the bandwidth wholesale. Some operators are treating these M2M networks as according to the enterprise networks model, and the associated operations support system (OSS) costs can be substantial M2M operators may not be able to pay the same rates as enterprise customers.

BRIEF DESCRIPTION OF THE DRAWINGS

For a more complete understanding of various embodiments of the disclosed subject matter, reference is now made to the following descriptions taken in connection with the accompanying drawings in which.

DETAILED DESCRIPTION

Figure 1:
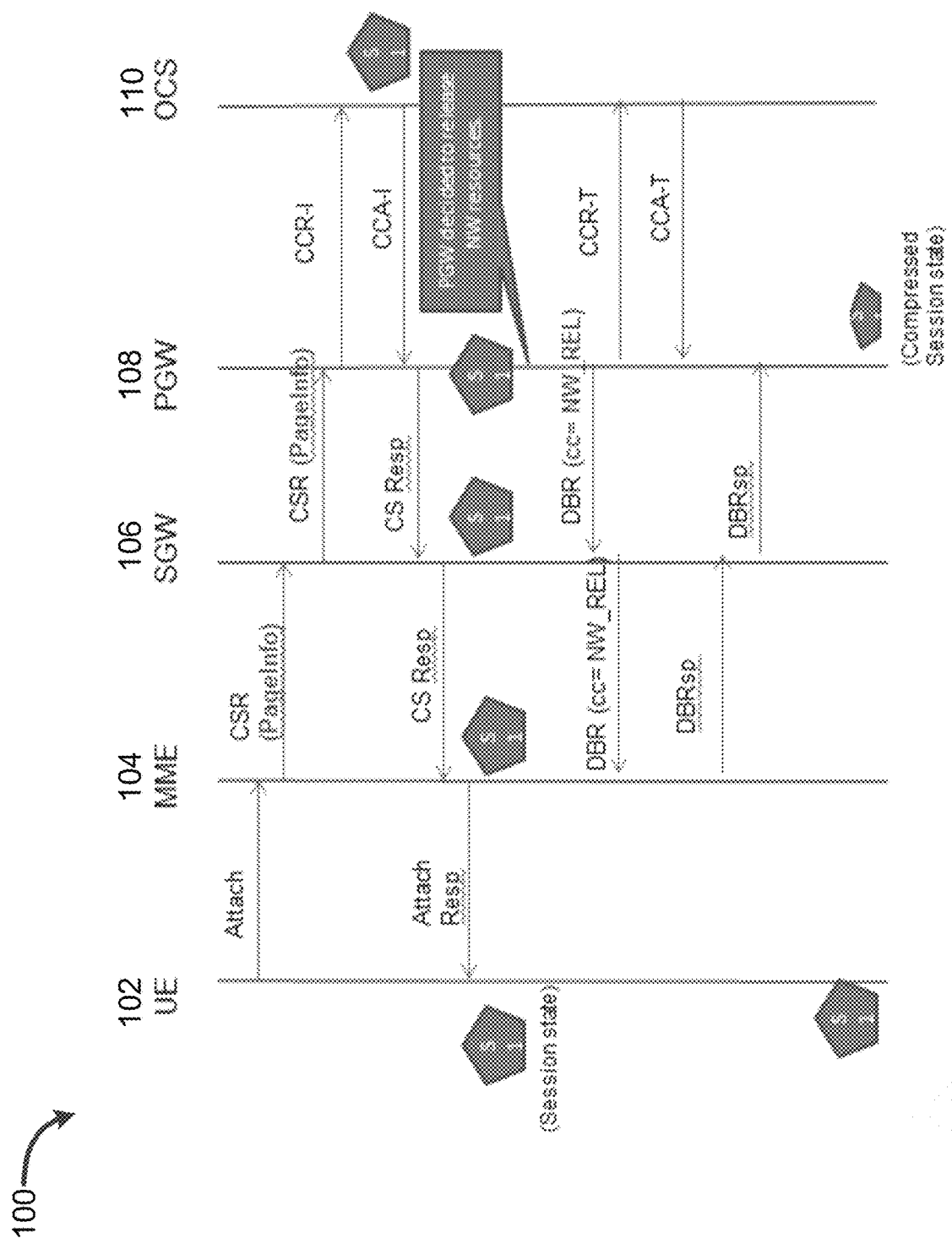
FIG. 1 is a flow diagram illustrating a subscriber call flow.

Some embodiments described herein relate to freeing up capacity in Evolved Packet Core (EPC) and other similar networks, so as to better accommodate M2M-type devices. For example, the number of OCS server sessions needed to service a given volume of network elements can be reduced using methods and systems described herein, such that an operator can use the EPC resources more efficiently. Other embodiments relate to online charging of grouped M2M devices, as opposed to individual devices.

Radio Access Network (RAN) Optimizations in Core Networks

In the context of Evolved Packet Core (EPC) networks, certain types of M2M devices do not necessarily need to be kept continuously online. Nevertheless. existing 4G LTE network architectures keep all subscriber sessions as "always on." As such, all associated network elements (e.g., mobility management entities (MMEs), home subscriber servers (HSS), serving gateways (SGWs), packet gateways (PGWs), policy and charging rules functions (PCRFs), online charging systems (OCSs), and offline charging systems (OFCSs)) are continuously operating in order to maintain the subscriber sessions. As the number of subscribers/M2M devices increases, the corresponding need for such network elements increases linearly. Maintaining a billion sessions at network elements MME, HSS, SGW, PGW, PCRF, OCS, OFCS can involve extensive infrastructure and extremely high operator costs. Virtualization of certain elements can help in reducing the costs, but still may not be economically feasible or justified.

Certain types of M2M devices do not need to remain continuously online. However, current LTE architectures do not allow network elements to release sessions on the network element (NE) side, and even if sessions are released, the user equipment (UE) would immediately come back. Moreover, if a UE releases its session, the network may not be able to reach the UE to reconnect.

Methods of improving NE resource utilization described herein include releasing NE session resources being consumed by an M2M device/UE while maintaining the user equipment (UE) session. While a session remains open, all the network elements MME, HSS, SGW, PGW, PCRF, OCS, OFCS need to maintain the subscriber sessions. In some embodiments, connectivity is maintained for these devices despite releasing the session resources by 1) maintaining the session between the UE and the network (i.e., the UE thinks that it is connected to the network), and storing session information in the PGW (or in any other node that is in communication with the PGW, such as the cloud) in a compressed or truncated fashion. For example, in some embodiments, a subset of session information can be stored. If, for example, the network later attempts to contact the UE (e.g. to send a data packet), the stored session information can be used to establish session resources that were previously released. In some embodiments, the session information can be stored in the PGW (or other node) in a compressed or truncated format without releasing session resources at some or all of the other network elements.

Techniques described herein can be applied to different network element levels, for example:
PGW only (+external nodes resources such as PCRF, OCS, etc.)
PGW and SGW (+external nodes resources)
SGW, MME and PGW (+external nodes resources)

Techniques described herein can he implemented with different timeout periods (e.g., 6 hours, 24-28 hours, on the order of days or weeks, etc.), for example depending upon the M2M device type. Closing the. session can be initiated, for example, based on Device. User Group "DUG" (e.g., when all members in the DUG have been inactive for more than a predetermined. period of time) or based on information from authentication, authorization and accounting ("AAA") servers (e.g., specifying a predetermined session duration).

In some embodiments, a session database is created and/or maintained on a PGW (or on any other node that is in communication with the PGW, such as the cloud) that can serve as a transaction-oriented system. For example, some or all sessions can be placed in the session database. Subsequently, whenever a session needs to be served, it could be assigned to a gateway ("GW"), or to a workflow ("WF") which can specify one or more gateway functions from a control plane perspective, based on the load on each GW. After a certain idle period of each session, the session can be purged from the GW but stored in the session database and, optionally, compressed or truncated. In some embodiments, when a network packet is received, the PGW would look in DB and initiate close on the session.

In some implementations, PageBlock Info IE is added to GTPv2 Control Signal in the create session request (CSR), (MBR). For example, an MME sends PageBlock info IE with page details of the UE. A new cause code (e.g., NW_REL_ONLY) is added to the release cause codes set so that the MME does not notify the UE about the session release, but releases local resources. In other words, unlike in traditional systems, the MME no longer retains information, such as the PageBlock Info IE, about the UE. Alternatively, or in addition, a network node element can he added, on which data released from the MME and/or the PGW can be stored. The PGW can release UE session resources while maintaining a compressed or truncated copy of session information. In some embodiments, the PGW can maintain the following information: UE IP Address, Page information, and MME/SGW Information.

Turning now to the figures, FIG. 1 shows a subscriber call flow 100, according to some embodiments. As shown, a subscriber's UE 102 sends an "attach" request to mobility management entity (MME) 104, which generates a create session request (CSR) (including PageInfo data) and sends it to serving gateway (SGW) 106. SGW 106 forwards the CSR message to a PGW 108 which, in response, generates and sends a CCR-I message to the OCS server 110 to initiate a session. The OCS server 110 sends a CCA-I message back to PGW 108, establishing the session. The PGW 108 generates and sends a create session response (CS Resp) to SGW 106, which forwards the CS Resp to MME 104, which in turn sends an attach response (Attach Resp) to UE 102. Subsequently, PGW 108 decides to release some network resource, and sends a delete bearer request (DBR), specifying cause code network release "cc-NW_REL," to SGW 106. The PGW 108's decision to release network resources can be based on one or more of: time period over which a particular resource has been in use, network load, a least recently used algorithm, capacity exceeding a predetermined threshold, and identification of one or more resources that has least recently been used. PGW 108 also sends a credit control request terminate (CCR-T) message to OCS server 110, which returns a credit control answer terminate (CCA-T) message to PGW 108. SGW 106 forwards the DBR message to MME 104. MME 104 sends a DBRsp message back to SGW 106 in response, and SGW 106 forwards the DBRsp message to PGW 108. At the end of subscriber call flow 100, the PGW has released UE session resources, but session data pertaining to the UE 102 is compressed and stored at the PGW 108, such that the session does not completely terminate, but is using fewer resources until the session becomes active again. The compressed session data can include one or more of: the UE 102's IP address, page information (e.g., PageBlock), and MME/SGW information. From the point of view of the UE 102, there is no apparent change in the session state.

Figure 2:
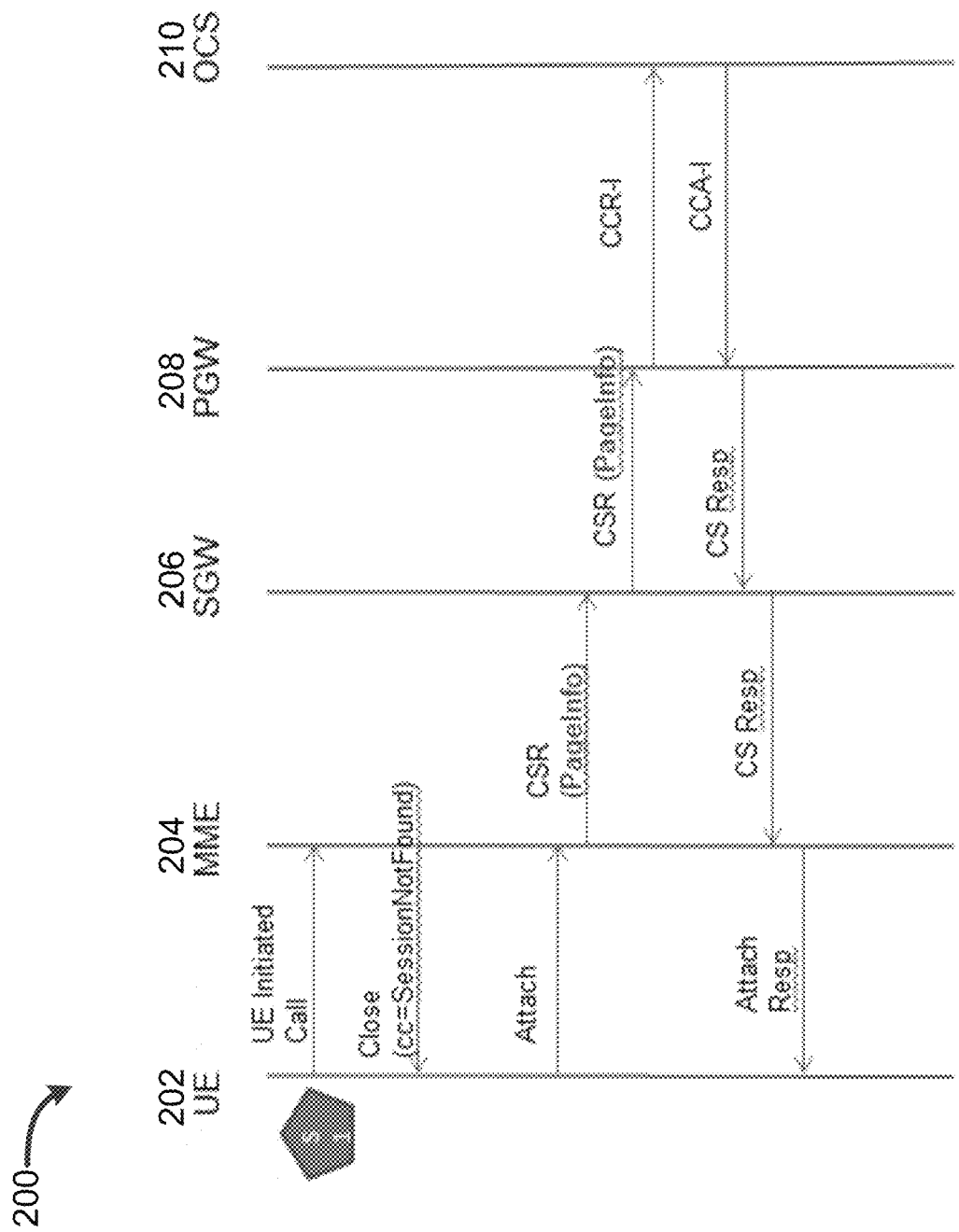
FIG. 2 is a flow diagram illustrating a user equipment (UE) initiated call flow.

FIG. 2 shows a UE initiated call flow 200, according to some embodiments. The flow 200 begins with subscriber UE 202 attempting to initiate a call by sending a message to MME 204 including the session ID that is known to the UE. Not detecting an active session (because it no longer stores the UE-related data), the MME 204 sends a "close" message (including the cause code "cc=SessionNotFound") back to UE 202. Next, UE 202 sends an "attach" message to MME 204, which generates and sends a CSR message (including "PageInfo") to SGW 206. SGW 206 sends the CSR message (including "PageInfo") to PGW 208, which generates and sends a CCR-I message to the OCS server 210 to initiate a session. OCS server 210 returns a CCA-I message to PGW 208, which generates and sends a "CS Resp" message to SGW 206, which in turn forwards the CS Resp to MME 204. MME 204 then sends an Attach Resp to UE 202 to confirm that a session has been initiated.

Figure 3:
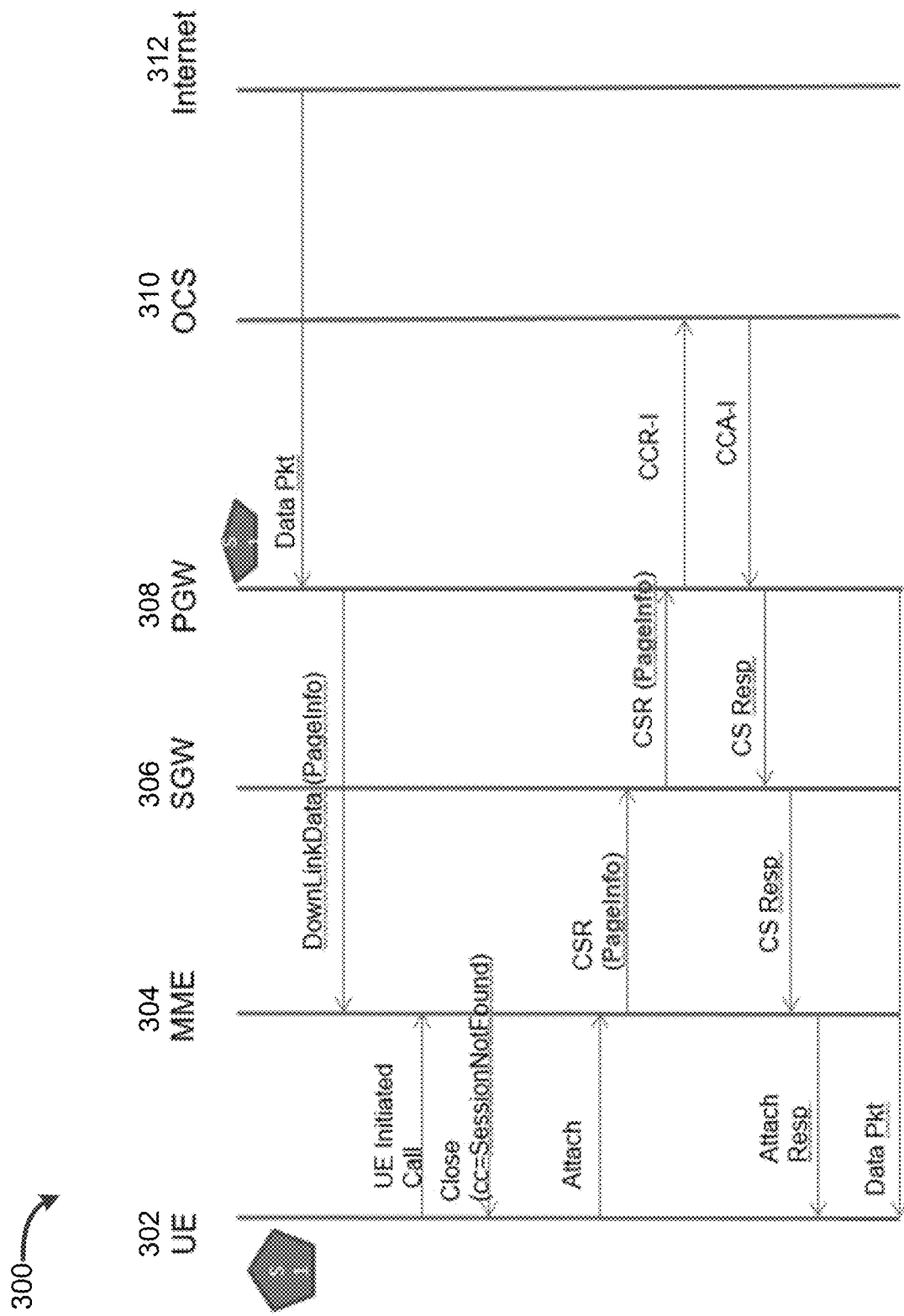
FIG. 3 is a flow diagram illustrating a network (NW) initiated call flow.

FIG. 3 shows a NW initiated call flow 300, according to some embodiments. Much of the flow described above with reference to FIG. 2 is also present in FIG. 3, however a data packet is first sent from the internet 312 to the PGW 308—where compressed or truncated session data is being stored—and the PGW 308 generates and sends DownLink-Data (including PageInfo) to MME 304, which sends a page to UE 302. Call flow 300 is similar to call flow 200, described above. Upon receiving the page, UE 302 attempts to initiate a call by sending a message to MME 304. The MME 302 does not detect an active session and sends a "close" message (including the cause code "cc=SessionNotFound") back to UE 302. Next, UE 302 sends an "attach" message to MME 304, which generates and sends a CSR message (including "PageInfo" to SGW 306. SGW 306 sends the CSR message (including "Page-Info") to PGW 308, which generates and sends a CCR-I message to OCS server 310 to initiate a session. OCS server 310 returns a CCA-I message to PGW 308, which generates a "CS Resp" message to SGW 306, which in turn forwards the CS Resp to MME 304. MME 304 then sends an Attach Resp to UE 302 to confirm that a session has been initiated.

The data packet first sent from the internet 312 to the PGW 308 is then delivered to UE 302 in a typical fashion.

Charging Optimizations for M2M

In existing network charging architectures, a single OCS session corresponds to a single subscriber. However, as M2M devices grow in prevalence, i.e., with the advent of the "internet of things" (IOT), there will be pressure to change the scale of servicing such devices. The 3$^{rd}$ Generation Partnership Project (3GPP) defines charging guidelines (under TR 23.887) for M2M devices, for example, to generate bulk charging data records (CDRs) for M2M devices belonging to the same group, however only offline charging is supported.

In some embodiments of the present disclosure, M2M devices are grouped together, for example using a common group identifier (ID) or "device user group" (DUG), such that they can be charged to the same (common) M2M operator for purposes of online charging. Such configurations can reduce the number of sessions that a given OCS needs to accommodate at a given time, releasing OCS capacity so that more subscribers can be serviced. For example, supposing that a subscriber requests a data allowance (e.g., 10 MB), an OCS/operator can approve the request and assign the 10 MB to a DUG without needing to know which device(s) or network elements the subscriber is using the data allowance for. This eliminates the one-to-one coupling between user devices and the OCS that charges the associated subscriber(s), and multiple subscribers and/or user devices can charge data via a single GCS session. In other words, a consolidation is implemented at the network element level. As a result, the number of sessions with the OCS server, for servicing a given number of subscribers, is reduced. The OCS also thereby processes data allowance requests in a more aggregated way, rather than based on small transactions usages.

In some implementations, a group of "same service" M2M devices can be configured locally or via one or more corresponding charging servers. Data/unit grants, usage and reporting levels can thus be performed at the group level rather than at the single-subscriber level.

In some embodiments, an online charging system (OCS) uses a Diameter Credit-Control Application (DCCA) application, such as RFC 4006, 32.299 Gx, Gy, etc., but streamlines the protocol to accommodate a group of M2M devices (associating multiple M2M devices with a single DUG and, optionally, a single associated quota). For example, online charging can be performed using a Credit Control application with the following messages:

Credit Control Request (CCR)
    INITIAL, UPDATE AND TERMINATE
Credit Control Answer (CCA)
    INITIAL, UPDATE AND TERMINATE
Re-authorization (RAR)

Figure 4:
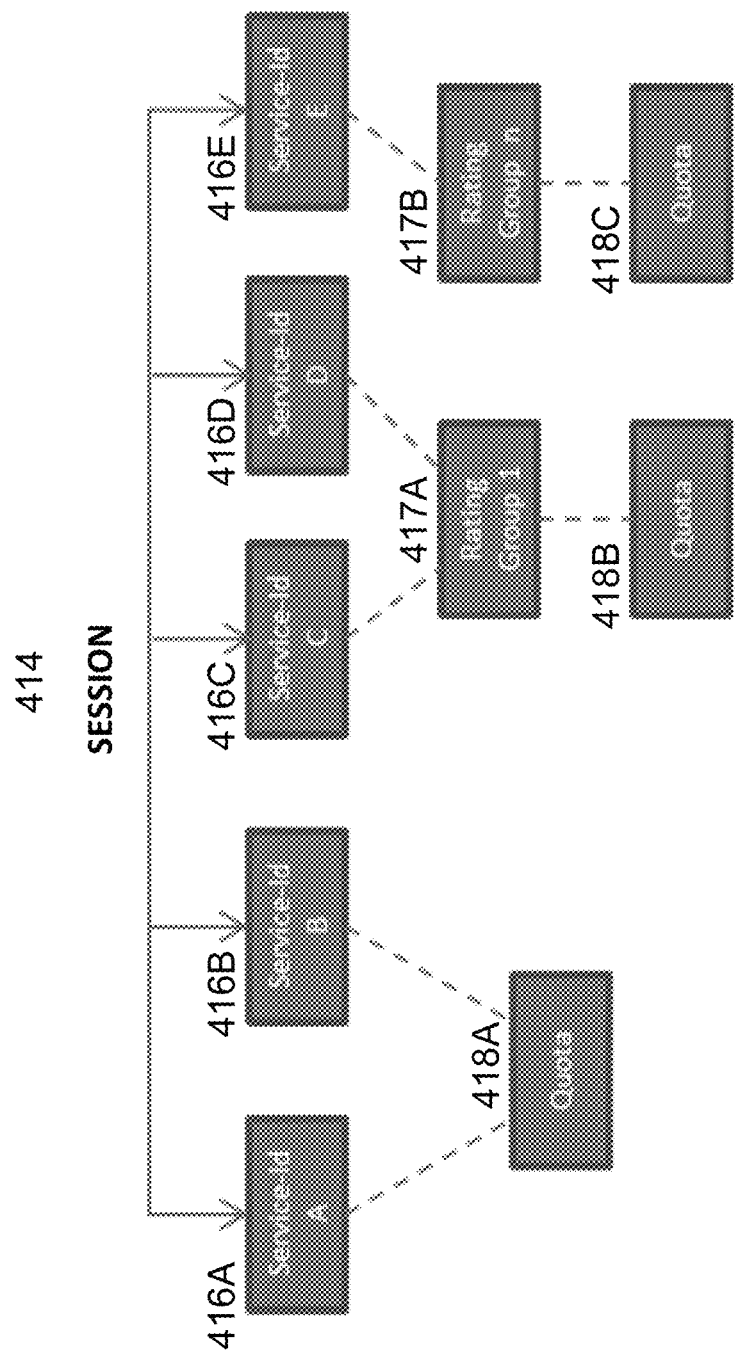
FIG. 4 is a block diagram illustrating a Diameter credit-control application (DCCA) session, in accordance with some embodiments of the disclosed subject matter.

FIG. 4 is a block diagram illustrating a single DCCA session for facilitating real-time online charging (e.g., performing grants), in accordance with some embodiments of the disclosed subject matter. As shown in FIG. 4, a single DCCA session 414 (e.g., hosted by an OCS server) is, for example, associated with five services identified by service identifiers "A" through "E"; 416A-416E, respectively. Each service is linked to a corresponding quota (418A, 418B and/or 418C) that is, in some cases, shared by multiple services. During the DCCA session, subscribers make data allowance requests, and data units can be granted if there is sufficient quota available to the subscriber. The service identifiers ("Service-Id"s) and the Rating Groups ("1" and "n"; 417A and 417B, respectively) are used to associate the granted unit(s) to a given service or rating group. This configuration provides flexibility to operators so that they can build/structure different services differently, since one or more different quotas can be assigned for each service that an operator has. For example, when a resource such as call time is cheap, the quota associated with that resource can be higher. In other words, resource allocations (e.g., energy units, data units, etc.) can be "cheaper" or "more expensive" (e.g., as indicated by an associated rating group) at different time periods within the same session. Quotas and/or rating groups can be based at least in part on the aggregation of a large plurality of devices (e.g., electric meters, cell phones, computing devices, etc.).

Figure 5:
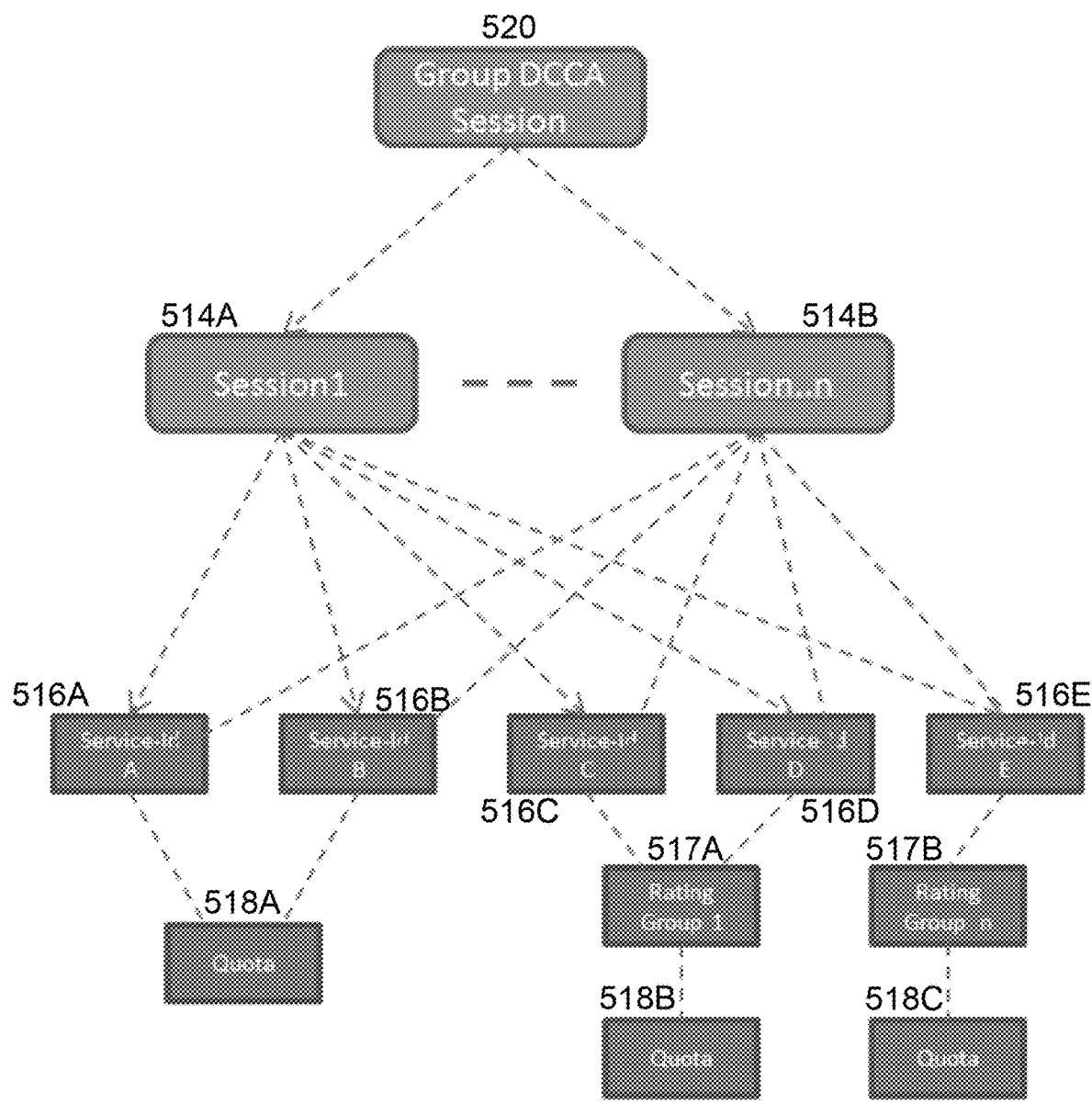
FIG. 5 is a block diagram illustrating, a group DCCA session, in accordance with some embodiments of the disclosed subject matter.

FIG. 5 is a block diagram illustrating a "group DCCA session" 520, in accordance with some embodiments of the disclosed subject matter. The group DCCA session 520 can correspond to a single subscriber (e.g. a water company) or a group of devices in a DUG (e.g. a plurality of water meters). A time series of subservient sessions (sessions "1" through "n"; 514A through 514B, respectively) can interact with the group DCCA session 520 in order to service online charging requests originating from individual subscribers or devices in a DUG. Each subservient session 514A-514B then operates as described above with reference to FIG. 4. In other words, session 1 (514A) and session n (514B) are, for example, each associated with five services identified by service identifiers "A" through "E"; 516A-516E, respectively. Each service is linked to a corresponding quota (518A, 518B and/or 518C) that is, in some cases, shared by multiple services. During each of sessions 1 through n, subscribers make data. allowance requests, and data units can be granted if there is sufficient quota available to the subscriber. As above, the service identifiers ("Service-Id"s) and the Rating Groups ("1" and "n"; 517A and 517B, respectively) are used to associate the granted unit(s) to a given service or rating group.

Modifications to DCCA AVPs

In some embodiments, a Subscription-Id-Type Attribute-Value Pair (AVP) is used to identify a user's subscription. A new Subscription Identifier type "END_USER_GROUP" can be defined to identify what group a particular M2M device belongs to. This information could be received, for example, from an M2M UE Device or home subscriber server (HSS) via a GTP-C V2 message. Another subscription identifier type "END_USER_IMEI" can be added to send an International Mobile Station Equipment Identity (IMEI) as part of Subscription-Id value. A Device-User-Group Name AVP can be added to Diameter (or any other suitable protocol that can be used for credit control applications) to represent the DUG.

In some embodiments, Used-Service-Unit AVPs can be used to carry each M2M device's specific information along with usage data. An embodiment of a Used-Service-Unit AVP according to the invention is as follows (see the parameters in bold):

---

Used-Service-Unit ::= < AVP Header: 446 >

---

[ Tariff-Change-Usage ]
[ CC-Time ]
[ CC-Money ]
[ CC-Total-Octets ]
[ CC-Input-Octets ]
[ CC-Output-Octets ]
[ CC-Service-Specific-Units ]
*[ subscription-Id ]
[ ULI ] (user location information)

-continued

```
Used-Service-Unit ::= < AVP Header: 446 >

[ UE-IP-Address]
[ IMEISV] (international mobile station equipment identity
software version)
[ RATType] (radio access technology type, e.g., LTE, 3G)
[ Serving-Network] (network by which the UE came to the
PGW)
*[ AVP ]
```

Modifications to GTP-C V2 Messages

In some embodiments, a new identifier is added to a General Packet Radio Service (GRPS) Tunneling Protocol (GTP-C) message to identify a M2M Device Group User. The new identifier can be UTF8-encoded and be a string-type variable. The new identifier can be used to define a group of same-type M2M Devices (i.e., that are supported by a single user) under a single access point name (APN), thereby supporting (i.e., facilitating charging, PCRF policy setting, etc.) multiple M2M Device User Group members in a single APN. A home subscriber server (HSS) or UE device can send this new information/attribute. If an HSS sends the information, it can override UE-passed information. The corresponding mobility management entity (MME) could then send the information to a SGW, and the SGW could send the information to PGW. In some implementations, the information is sent as part of an initial bearer setup message, for example a Create Session Request message, which cannot be modified once the hearer is setup. If the HSS modifies it, the bearer would he terminated and re-created with new attribute value.

An example of the Device Group identifier Attribute is as follows:

| Octets | Bits | | | | | | | |
|---|---|---|---|---|---|---|---|---|
| | 8 | 7 | 6 | 5 | 4 | 3 | 2 | 1 |
| 1 | Type = 221 | | | | | | | |
| 2 to 3 | Length = n | | | | | | | |
| 4 | Spare | | | | Instance | | | |
| 5 to (n + 4) | These octet(s) is/are present only if explicitly specified | | | | | | | |

The Device Group Identifier can come in one of several ways. For example, the UE may itself contain the Device Group Identifier (e.g., in memory) and send it. Alternatively or in addition, the HSS can obtain the Device Group Identifier while performing authentication of a UE and send it to a SGW/PGW using GTP V2/V1 control protocol. Alternatively or in addition, the Device Group Identifier can be received from any external authentication, authorization and accounting (AAA) servers, for example using 29.061 Radius/Diameter protocols.

A virtual EPC implementation (e.g., such as Affirmed Network's gateway MCC) can use the Device Group identifier as a subscriber analyzer key. A number of devices in a group can be defined, for example, based on a local configuration on each interface type (e.g., PCRF interface, AAA interface, OCS interface, credit control interface, offline charging interface), or a PCRF/AAA/OCS server can determine the number of devices in each group.

In some embodiments, multiple Diameter sessions can exist for each device user group, but individual devices can be present in only one of the Diameter session groups. A particular IMEI can only belong to a single DUG, however the DUG can be associated with multiple sessions concurrently.

Figure 6:
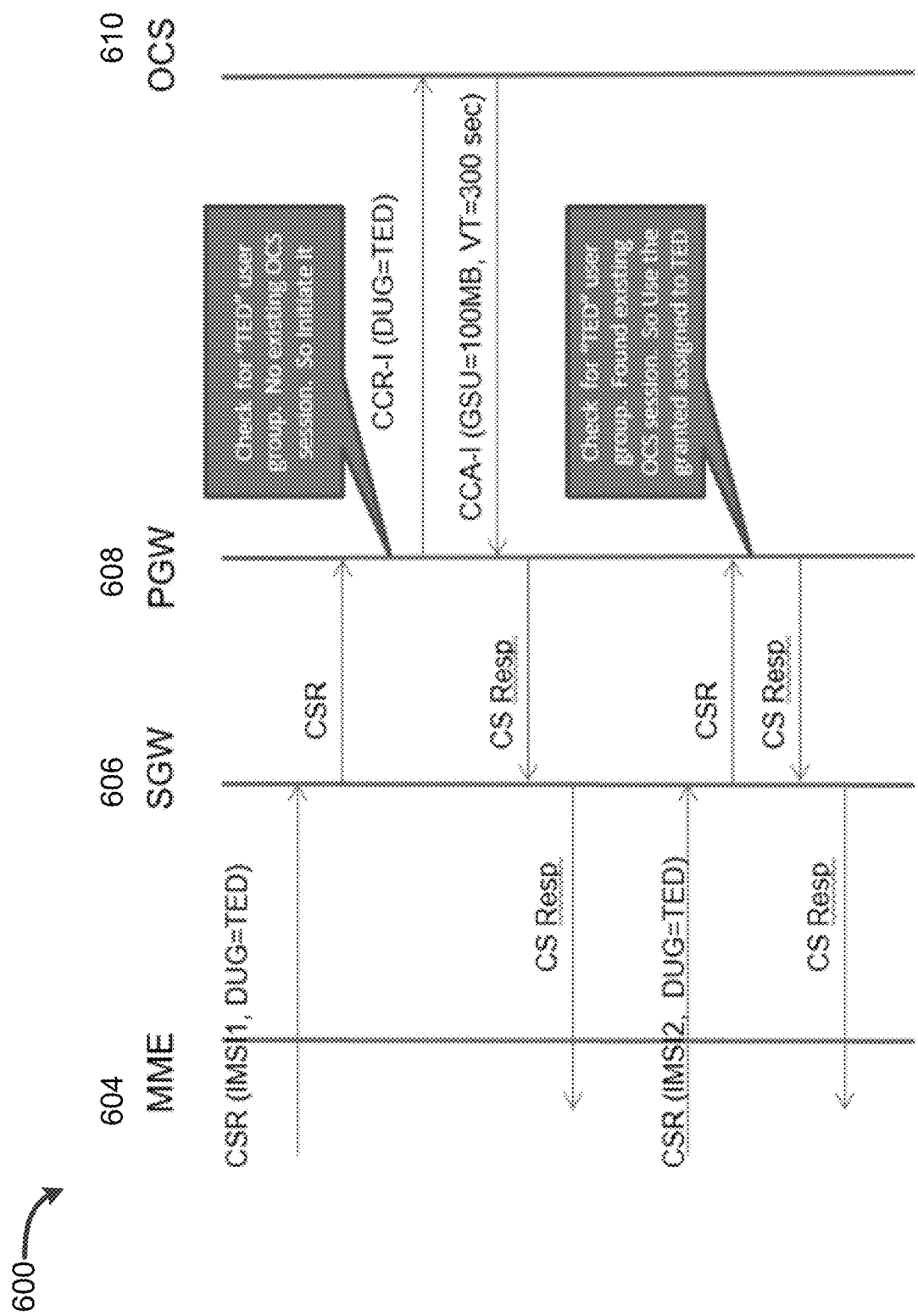
FIG. 6 is a flow diagram illustrating an initial subscriber call flow, in accordance with some embodiments of the disclosed subject matter.

FIG. 6 is a flow diagram illustrating an initial subscriber call flow 600, according to some embodiments. An MME 604 sends a create session request (CSR) for international mobile subscriber identify ("IMSI") of "IMSI1" and a designated user group (DUG) "TED" to SGW 606, which passes the CSR to PGW 608, which checks for the "TED" user group. In the scenario shown in FIG. 6, there is no existing OCS session at the time that the PGW receives the CSR, so the PGW sends a credit control request initiate ("CCR-I") message for DUG "TED" to the OCS server 610, requesting a session to be initiated. The OCS server sends back a credit control answer (CCA-I), specifying granted service units ("GSU"=100 MB) and a validity time ("VT"=300 seconds). A create session response ("CS Resp") is sent from PGW 608 to SGW 606, which passes it to the MME 604. Later, the MME 604 sends a second CSR, this time for IMSI2, who also belongs to DUG "TED" to the SGW 606. which again sends a CSR to PGW 608. PGW 608 again checks for the "TED" user group, and this time detects that there is already an existing OCS session. As such, the PGW 608 does not need to send another CCR-I request to the OCS. Rather, the PGW 608 uses data units already previously granted to "TED" during the existing session, and generates a CS Resp (which it sends to SGW 606) on that basis. The SGW 606 then passes the CS Resp to MME 604 for IMSI2.

Figure 7:
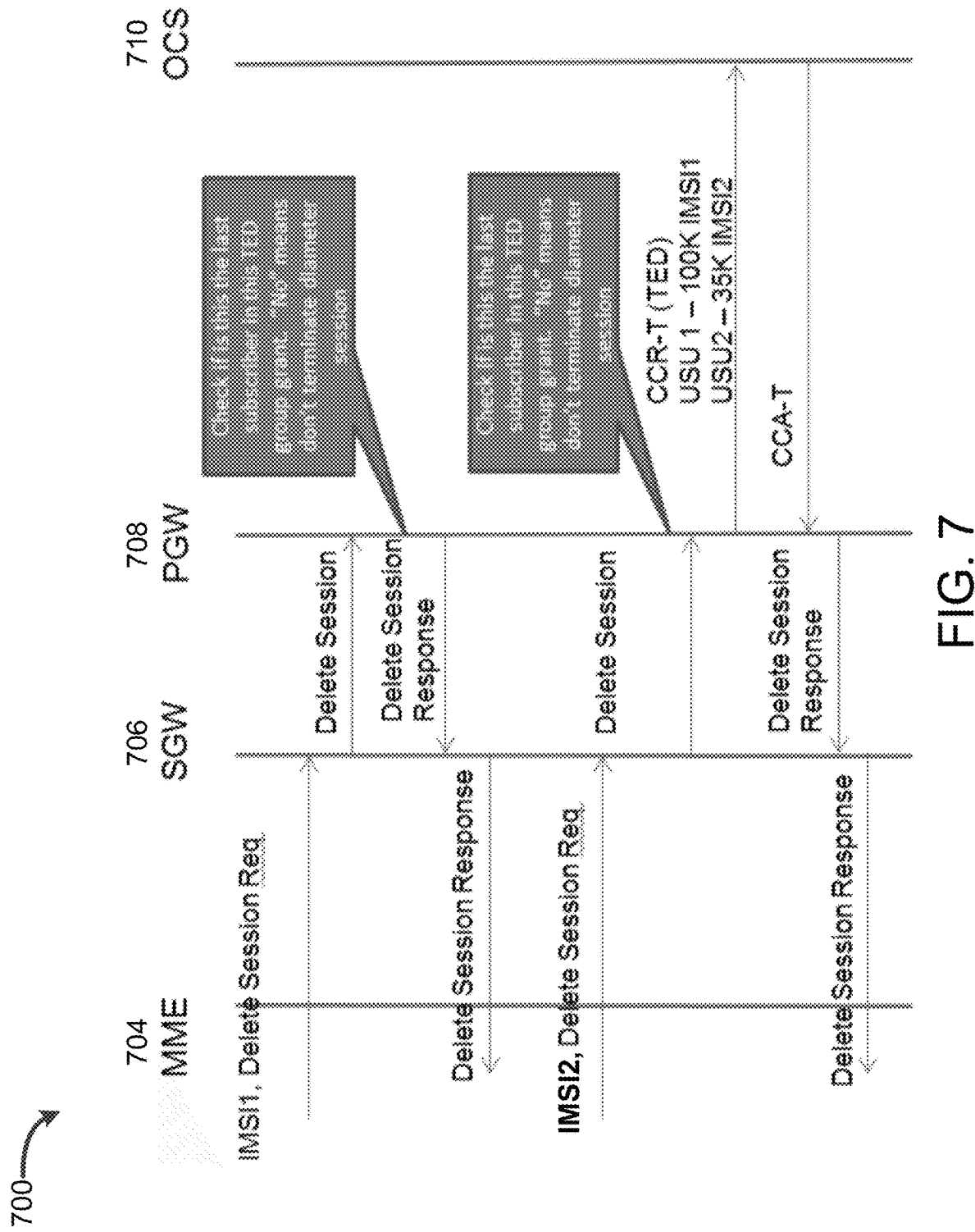
FIG. 7 is a flow diagram illustrating a subscriber termination call flow, in accordance with some embodiments of the disclosed subject matter.

FIG. 7 is a flow diagram illustrating a subscriber termination call flow 700, according to some embodiments. An MME 704 sends a delete session request for IMSI1 to the SGW 706, which in response sends a delete session request to PGW 708. The PGW 708 checks to see whether IMSI1 is the last subscriber in the TED group grant discussed above with reference to FIG. 6. If PGW 708 determines that IMSI1 is not the last TED subscriber, then the PGW 708 declines to terminate the online charging (e.g., Diameter) session, and communicates that denial via a "delete session response" message to SGW 706, who forwards it to MME 704. Lower in the flow diagram, MME 704 sends another delete session request for IMSI2. This time, the PGW 708 determines that IMSI1 is the last TED subscriber, and sends a CCR-T terminate request to OCS 710, specifying used service units ("USU") for IMSI1 and IMSI2 (both members of DUG "TED"). As shown in FIG. 7, IMSI1 used 100,000 USUs and IMSI2 used 35,000 USUs. The OCS server 710 sends a credit control answer (CCA-T) terminate acknowledgment to PGW 708. PGW 708 then generates a delete session response, which it passes to SGW 706, who forwards it to MME 704.

Figure 8:
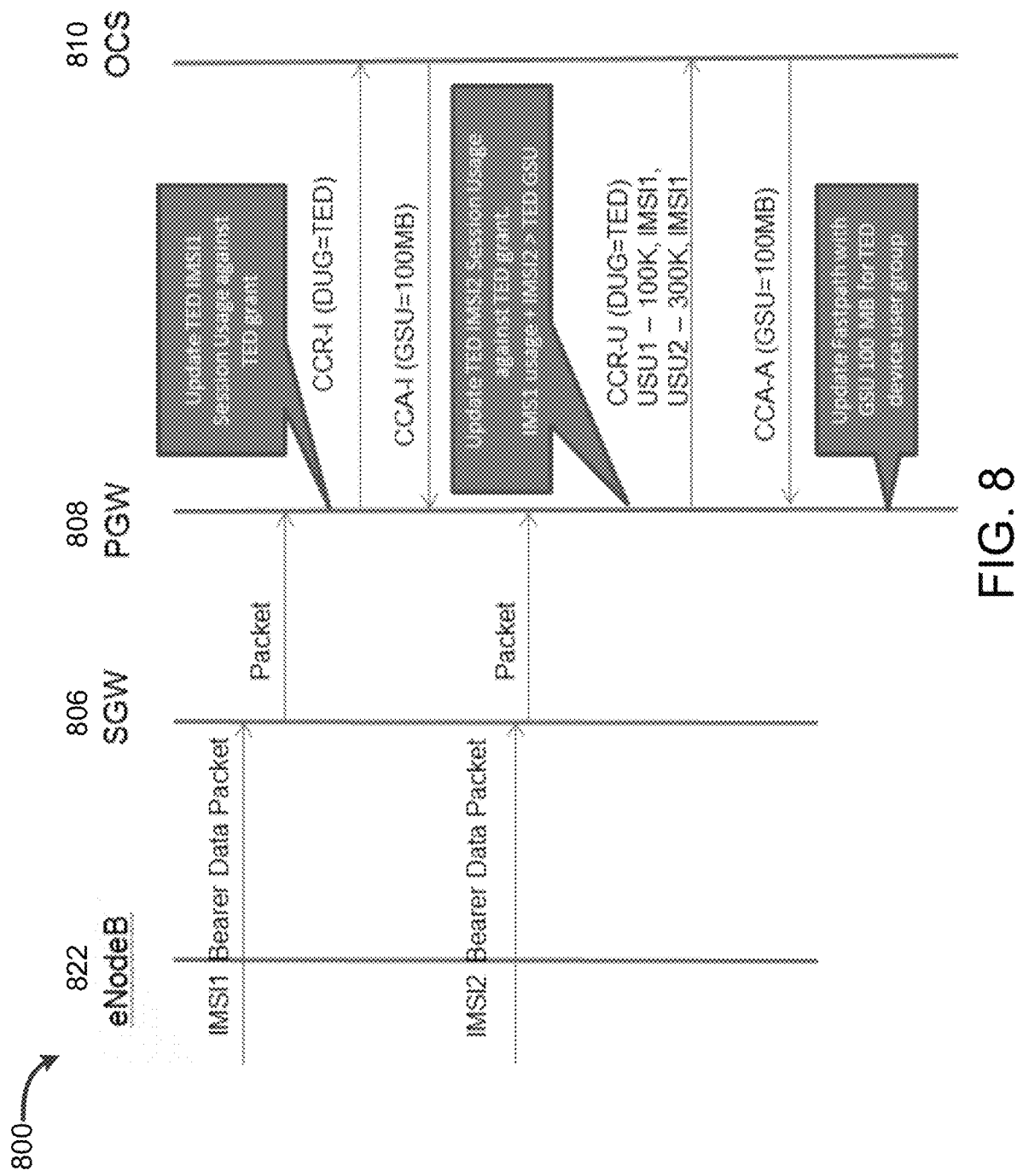
FIG. 8 is a flow diagram illustrating an update call flow, in accordance with some embodiments of the disclosed subject matter.

FIG. 8 is a flow diagram illustrating an update call flow 800, according to some embodiments. At 822, eNodeB sends a bearer data packet for IMSI1 to SGW 806, which generates a packet and sends it to PGW 808. The PGW 808 then updates its local memory to reflect IMSI1's (of user group "TED") session usage against the TED data grant. PGW 808 then sends a CCR-I message for DUG=TED to the OCS server 810. The OCS server 810 replies with a CCA-I, granting 100 MB of GSUs. Subsequently, eNodeB 822 sends a bearer data packet for IMSI2 to SGW 806, which generates another packet and sends it to PGW 808. The PGW 808 then updates its local memory to reflect IMSI2's (of user group "TED") session usage against the TED data grant. At this point in FIG. 8, the PGW 808 determined that the combined usage of IMSI1 and IMSI2 now exceeds the granted service units (GSU) for the user group TED. As such, PGW 808 then sends a CCR-U message for DUG=TED to the OCS server 810, specifying "USU1—100K, IMSI1" and "USU2—300K, IMSI1." The OCS server 810 replies with a CCA-A, granting another 100 MB of GSUs. The PGW 808 then updates a traffic detection function ("TDF") and/or a policy and charging, enforcement function ("PCEF") with 100 MB of GSUs for the TED device user group.

Gx Interface Optimization

In some embodiments, instead of obtaining subscriber policies for each. subscriber, a Policy Control and Charging Function (PCEF) can determine whether a group policy has already been received from the Policy Control and Charging Rules Function (PCRF). Based on the M2M device group user name and associated APN, the PCEF could send a request for subscriber policy data to the PCRF. Once subscriber policy data is available for a given M2M device group user, it (e.g., the PGW) could cache this policy data. In some embodiments, another M2M device with the same DUG and APN could check first locally to determine whether policy data has already been fetched. If so, it would use them. PCRF or local configuration data can be used to determine the number of subscribers in a given user group. The PCRF also can set a validity timer (e.g., a predetermined time interval after which the PCRF performs a check or updates) to force a re-evaluation of these subscriber rules. The PCRF can still use a reauthorization (RAR) message to re-authenticate based on the user groups whenever there is a change in the operator configuration of these device groups.

Figure 9:
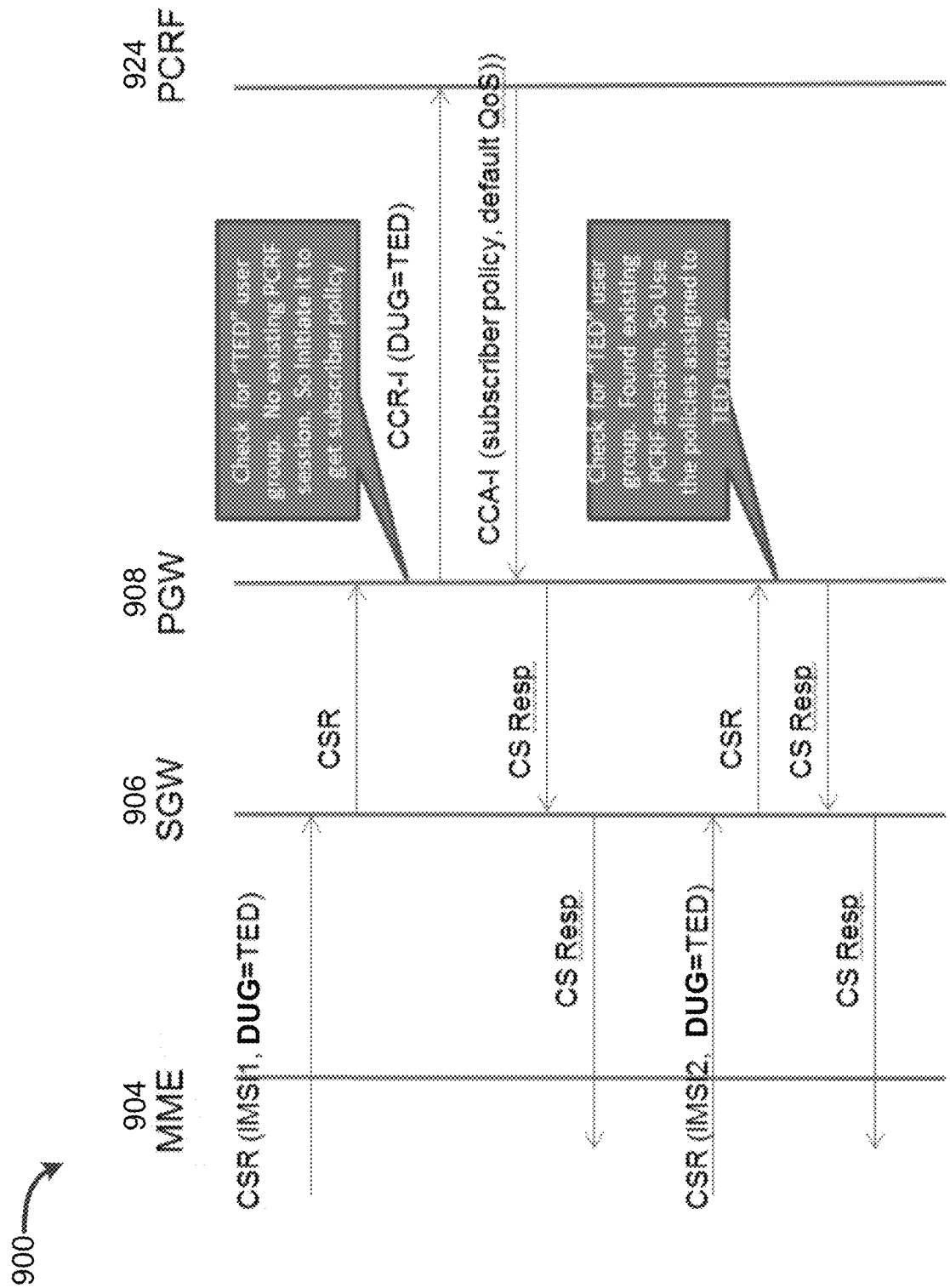
FIG. 9 is a flow diagram illustrating an initial subscriber call flow, in accordance with some embodiments of the disclosed subject matter.

FIG. 9 is a flow diagram illustrating another initial subscriber call flow 900, according to some embodiments. The flow begins with MME 904 sending a CSR for IMSI1 of user group "TED" to the SGW 906, as previously described. The SGW 906 sends a CSR to PGW 908, which checks for the TED user group, and also determines that there is currently no existing PCRF session. As such, the PGW 908 initiates a PCRF session (e.g., so that it can obtain subscriber policy data) by sending a CCR-I for user group TED to PCRF 924. PCRF 924 returns a CCA-I message, including subscriber policy data and default quality of service (QoS) data, to PGW 908. The PGW 908 then generates a CS Resp message, which it sends to SGW 906, which in turn sends it to MME 904. Subsequently, MME 904 sends a CSR for IMSI2 of user group "TED" to SGW 906, which sends a CSR to PGW 908, which checks for the TED user group, and also this time determines that there is currently an existing PCRF session. As such, the PGW 908 applies the policies that are assigned to the TED group, which it has already obtained from the previous CCA-I message received from the PCRF 924 earlier in the session. Accordingly, the PGW 908 does not need to communicate with the PCRF 924 at this stage. The PGW 908 again generates a CS Resp message, which it sends to SGW 906, which in turn sends it to MME 904. In some implementations, the flow 900 of FIG. 9 can include a PCRF termination process similar to the OCS session termination process described above with reference to FIG. 7. For example, if a user IMSI1 commences a session, the PCRF responds, later drops off and no other users join the session, the PCRF can terminate the session. In some embodiments, re-validation of a subscriber policy can be performed (e.g., by the. PGW 908 sending a CCR-I message to the PCRF 924) according to a predetermined schedule. Alternatively, or in addition, the PCRF can "push" updates to the PGW 908 (e.g., CCA-I via RAR, no need to terminate.) in response to a change that is detected at the server level (i.e., a change. in subscriber policy). in some such cases, the PCRF 924 only pushes changes to the subscriber policy to the PGW 908 if there is a session in progress at the time the update/change is detected by the PCRF 924.

The techniques and systems disclosed herein may be implemented as a computer program product for use with a network, computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a network, computer system or a device, via a modem or other interface device, such as a communications adapter connected to a network over a medium.

The medium may be either a tangible medium (e.g., optical or analog communications lines) or a medium implemented with wireless techniques (e.g., Wi-Fi microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In the foregoing, description, certain steps or processes can he performed on particular servers or as part of a particular engine. These descriptions are merely illustrative, as the specific steps can be performed on various hardware devices, including, but not limited to, server systems and/or mobile devices. Similarly, the division of where the particular steps are performed can vary, it being understood that no division or a different division is within the scope of the invention. Moreover, the use of "module" and/or other terms used to describe computer system processing is intended to be interchangeable and to represent logic or circuitry in which the functionality can be executed.

The invention claimed is:

1. A method for conserving network resources in a mobile communications network, the method being implemented by a first network node, the method comprising:
   determining that each of a plurality of members of a device user group ("DUG") has been inactive for more than a predetermined period of time, wherein the plurality of members includes a User Equipment ("UE") associated with an existing UE session;
   in response to determining that each of the plurality of members has been inactive for more than the predetermined period of time:
      identifying a subset of information related to the existing UE session, wherein the subset of information can be used to create a new UE session associated with the UE;
      storing the subset of information;

releasing network resources associated with the existing UE session at the first network node, wherein the UE is not notified of said releasing; and transmitting a release cause code to a second network node, wherein the release cause code causes the second network node to release local network resources at the second network node without notifying the UE about releasing the local network resources;

receiving a request to transfer data to the UE;

creating the new UE session using the subset of session information and establishing network resources associated with the new UE session at the first network node and the second network node; and transferring the data to the UE using the new UE session.

2. The method of claim 1, wherein the subset of information comprises UE IP Address, Page Information, and Mobility Management Entity (MME)/Serving Gateway (SGW) Information.

3. The method of claim 1, wherein said storing the subset of information comprises storing information at a Packet Gateway ("PGW").

4. The method of claim 1, wherein said storing the subset of information comprises storing information at a node connected to a Packet Gateway ("PGW").

5. The method of claim 1, wherein said storing the subset of information comprises storing information in a session database.

6. The method of claim 1, wherein:

prior to determining that each of the plurality of members of the DUG has been inactive for more than the predetermined period of time, the first network node comprises the subset of information and additional information related to the existing UE session;

the subset of information is stored in a session database in response to determining that each of the plurality of members of the DUG has been inactive for more than the predetermined period of time; and releasing the network resources comprises purging the additional information from the first network node without storing the additional information in the session database.

7. The method of claim 1, wherein:

the first network node comprises a Packet Gateway (PGW); and the second network node comprises a Serving Gateway (SGW).

8. The method of claim 1, wherein:

the first network node comprises a Serving Gateway (SGW); and the second network node comprises a Mobility Management Entity (MME).

9. A non-transitory computer readable medium comprising instructions that are executable by one or more processors to cause a first network node to:

determine that each of a plurality of members of a device user group ("DUG") has been inactive for more than a predetermined period of time, wherein the plurality of members includes a User Equipment ("UE") associated with an existing UE session;

in response to determining that each of the plurality of members has been inactive for more than the predetermined period of time:

identify a subset of information related to the existing UE session, wherein the subset of information can be used to create a new UE session associated with the UE;

store the subset of information;

release network resources associated with the existing UE session at the first network node, wherein the UE is not notified of said releasing;

transmit a release cause code to a second network node, wherein the release cause code causes the second network node to release local network resources at the second network node without notifying the UE about releasing the local network resources;

receive a request to transfer data to the UE;

create a new UE session using the stored subset of session information and establishing network resources associated with the new UE session at the first network node and the second network node; and transfer the data to the UE using the new UE session.

10. The non-transitory computer readable medium of claim 9, wherein the subset of information comprises UE IP Address, Page Information, and Mobility Management Entity (MME)/Serving Gateway (SGW) Information.

11. The non-transitory computer readable medium of claim 9, wherein the first network node comprises a Packet Gateway ("PGW") or a node connected to a PGW.

12. The non-transitory computer readable medium of claim 9, wherein said storing the subset of information comprises storing information in a session database.

* * * * *